June 5, 1951     O. L. GARRETSON     2,555,640
PACKING GLAND LUBRICATOR
Filed Dec. 29, 1945
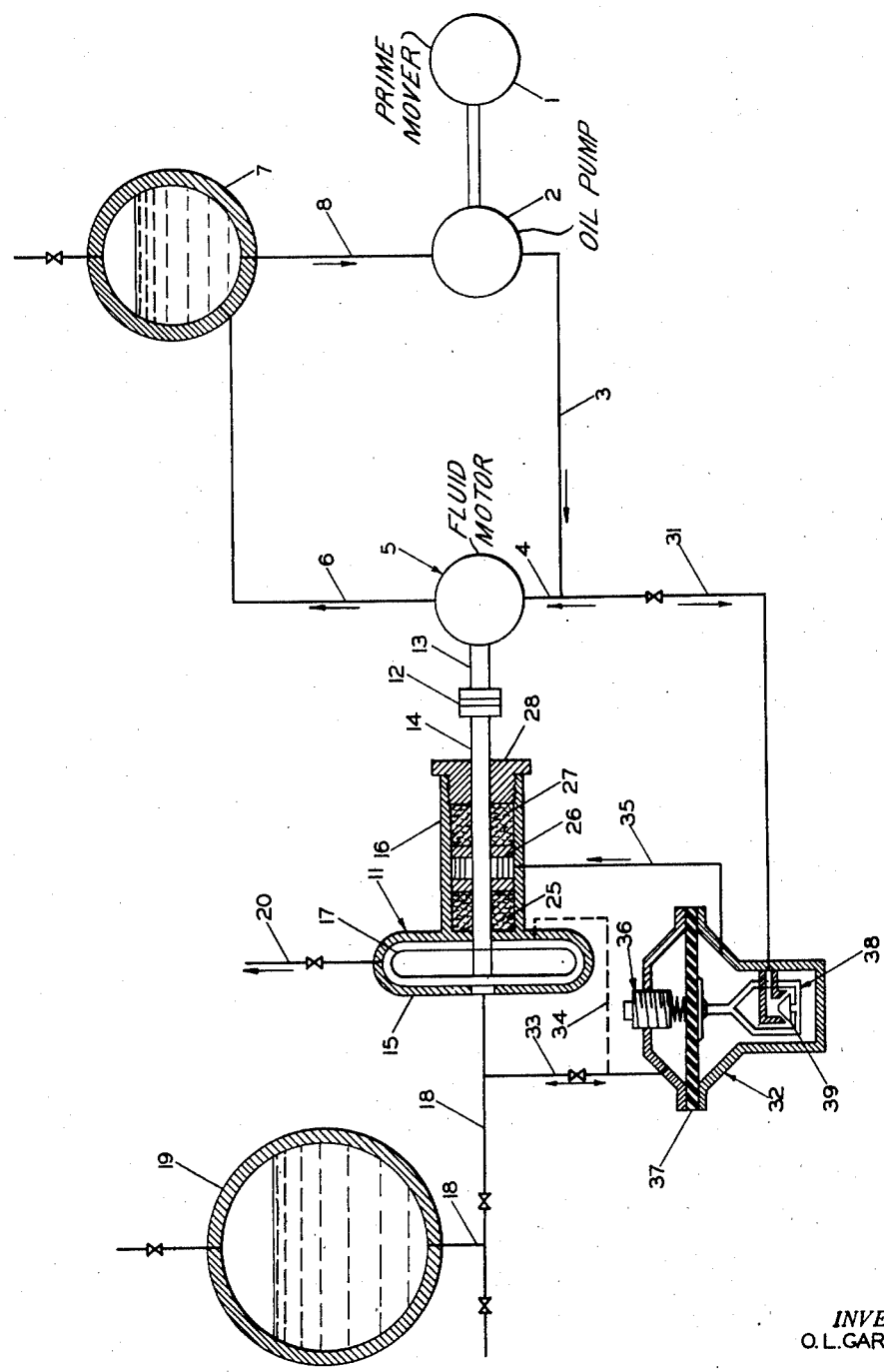
INVENTOR.
O. L. GARRETSON
BY Hudson & Young
ATTORNEYS Patented June 5, 1951

2,555,640

UNITED STATES PATENT OFFICE 2,555,640

PACKING GLAND LUBRICATOR

Owen L. Garretson, Bartlesville, Okla., assignor to Phillips Petroleum Company, a corporation of Delaware Application December 29, 1945, Serial No. 638,408

3 Claims. (Cl. 103—87)

This invention relates to lubrication of centrifugal pump packing glands. In one of its more specific aspects it relates to the lubrication of packing glands of centrifugal pumps in liquefied petroleum gas service.

In the transfer of non-lubricating liquids by centrifugal pumps, the packing gland assemblies of such pumps are frequently difficult to lubricate and to maintain in a fluid tight condition with respect to the non-lubricating liquid being pumped. Further difficulty may be experienced when the liquid being pumped is a solvent for packing gland lubricating materials.

I have found a method for lubricating pumps in liquefied petroleum gas service, which method is broadly applicable and has special utility on portable transportation units, such as tank trucks.

One object of my invention is to provide a means for the lubrication of packing glands of centrifugal pumps in service wherein the liquid being pumped is a non-lubricating liquid or is a solvent for lubricants ordinarily used.

Still another object of my invention is to provide a method for the lubrication of packing glands of centrifugal pumps on tank trucks in liquefied petroleum gas transportation service.

Yet another object of my invention is to provide a method for the lubricating of packing glands of centrifugal pumps in liquefied petroleum gas service and wherein the centrifugal pump is powered by a fluid motor.

Still other objects and advantages of my invention will be apparent to those skilled in the art by reference to the following detailed description and annexed drawing which respectively describes and illustrates a preferred embodiment of my invention.

The drawing illustrates diagrammatically one form of apparatus for carrying out the method of my invention.

Referring now to the drawing, numeral 1 refers to a source of power, as for example the engine or motor of a truck. This truck motor may be connected directly with an oil pump 2 which is adapted to pump oil at a relatively high pressure. This oil pump discharges oil under high pressure through a flexible tube 3, the oil flowing on through a tube 4, a fluid motor 5, a flexible tube 6 and thence into a small storage or surge tank 7. A tube 8 carries the oil from its surge tank 7 to the inlet side of the oil pump 2.

The fluid motor 5 is of such design as to rotate at a sufficiently high R. P. M. to drive a centrifugal pump 11. A flexible coupling 12 serves as a power transmitting connection between a shaft 13 of the fluid motor and an impeller shaft 14 of the centrifugal pump. The centrifugal pump 11 has a pump volute or casing 15, a stuffing box 16, and an impeller 17 made integral with the shaft 14.

This centrifugal pump, for illustration purposes takes suction through a suction line 18 on a tank 19 and discharges through an outlet line 20.

The stuffing box 16 contains conventional packing rings 25, a gland 26, further packing rings 27 and a packing take-up nut 28.

A small diameter tube 31 connects with the tube 4 and leads to the lower portion of a differential regulator 32. A tube 33 makes fluid communication from the top of this differential regulator to the inlet side of the pump by way of the inlet or suction line 18. A second and alternative embodiment of this fluid communication involves a tube 34 which is illustrated as connecting the back or rear side of the pump volute with the top portion of the regulator by way of a portion of tube 33.

The regulator is a differential type instrument and contains a diaphragm member 37, a spring adjustment member 36 and a shut-off valve assembly 38. A tube 35 makes fluid connection from the portion of the regulator below the diaphragm to the lantern gland 26 of the pump packing.

When my invention is applied to a tank truck adapted for the transportation of liquefied petroleum gas the vessel 19 represents the truck tank and the centrifugal pump 11, the differential pressure regulator 32 and the fluid motor 5 with their pipe or tube connections are mounted in close proximity with respect to said tank 19. The motor 1 is the truck power plant and may be a Diesel engine or an ordinary motor with a carbureter adapted for the use of gasoline, or for the use of liquefied petroleum gas. This engine is in direct connection with the pump 2 when it is desired to operate the centrifugal pump 5. The tank 7 may be mounted at any convenient point on the truck. The tubes 3, 6 and 8 may preferably be flexible tubes so that they may be able to absorb vibration without rupture. The pump 2 may preferably be located under the "hood" in order to afford operating connection between this pump and the engine.

When such a piece of equipment is a tractor and trailer assembly the flexible tubings 3, 6 and 8 afford excellent connecting members between the trailer and tractor.

In order to power such a fluid motor as motor 5, oil pressure of the order of 500 pounds per square inch may be supplied by the oil pressure pump 2. This pump 2 takes suction through line 8 on the storage tank 7 and discharges its oil at said pressure by way of the pressure lines 3 and 4 to the fluid motor 5. After passing through the motor the oil returns by way of tube 6 to the oil tank 7.

The hydraulic motor 5 is intended to rotate at sufficient speed to power in a proper manner the centrifugal pump 11.

When the centrifugal pump 11 is in liquefied petroleum gas service it is a difficult task to prevent leakage through packing gland assembly. To prevent such leakage and to lubricate the packing members, I herein provide for the transmission of oil from reservoir 7 by way of the pump 2, lines 3 and 31, regulator 32 and tube 35 to the packing gland assembly at a pressure slightly greater than the pressure of the liquid being pumped. The pressure differential is maintained between the oil in tube 35 and the liquid being pumped by adjustment of the compression spring assembly 36. The valve in tube 33 is open thereby establishing fluid communication between the liquid being pumped in the suction line 18 and the top of the diaphragm 37 in the regulator 32. For example, if the liquid being pumped is a liquefied petroleum gas consisting largely of liquid propane, the actual pressure in the line 18 may be of the order of 180 pounds per square inch. This pressure is communicated to the top of the diaphragm 37. When the spring mechanism 36 is set at 5 pounds per square inch then the pressure necessary to raise the valve 39 is at least 185 pounds per square inch acting on the under side of the diaphragm. When this pressure is exactly 185 pounds per square inch then there exists a pressure differential of about 5 pounds tending to cause flow of oil through tube 35 gland member 26, packing 25 and into the pump volute 15. However, since the packing take-up nut 28 is ordinarily so adjusted as to maintain the packing assembly members in rather tight adjustment there is little actual flow of oil from tube 35 into the pump volute 15. The main point is to maintain a pressure differential in that direction to prevent leakage of fluid being pumped and to keep a lubricating oil in the packing gland assembly. Such an oil as is adapted to the operation of a pressure pump-fluid motor combination is an ideal oil for sealing and lubricating the packing gland of a centrifugal pump in such a service as herein described.

As stated hereinbefore, the oil pump 2 puts up a pressure of the order of 500 pounds per square inch, and obviously such a pressure is not needed to supply sufficient oil to the packing gland of the centrifugal pump for sealing and lubrication purposes. Even though such a pressure exists in tube 31, it is not actually transmitted through the regulator 32. When the pressure on the bottom of the diaphragm drops to a value below the fluid pressure on the top of the diaphragm plus the spring setting the diaphragm pushes downward and opens the valve 38 to the high pressure oil in tube 31. Oil then tends to flow from tube 31 through the valve assembly 38 into the bottom compartment of the regulator and when this occurs, pressure then builds up quickly in this bottom compartment and rapidly exceeds the combined fluid pressure and spring pressure and accordingly raises the diaphragm to close the valve 39 to further increase of pressure. This valve for all intents and purposes gets closed long before the pressure in the lower portion of the regulator reaches the pump 2 pressure.

If desired the spring mechanism 36 may be so adjusted as to maintain a pressure differential of 10 pounds per square inch, or 50 pounds, or the 5 pounds as stated hereinbefore, or any pressure as deemed necessary to maintain slight oil flow from tube 35 through the gland 26, packing 25 into the pump volute 15.

As mentioned hereinbefore, the equalization line from the top of the regulator 32 may be such as tube 33 connecting with the suction line 18, or may be such as tube 34 connecting with the interior of the pump volute 15 at a point on the back side of the impeller 17.

In the manner as herein explained I have been able to lengthen considerably the useful life of the packing material 25 and 27, to prevent liquefied petroleum gas leakage when pumping this material and to lower materially the packing gland operating temperature.

Materials of construction of all parts of the apparatus may be selected from among those commercially available. Any materials suitable for the construction of the tanks and pumps, etc. in the absence of my invention may be used in conjunction with my invention as herein disclosed.

Any type of differential regulator 32 may be used provided, of course, it performs its intended function as herein described.

Such auxiliary apparatus as valves, and the details of the standard engine 1 and pump 2 and fluid motor 3 have not been given for purposes of simplicity.

It will be obvious to those skilled in the art that my invention as herein disclosed has wide application, and that many modifications and alterations therein may be made and yet remain within the intended spirit and scope of my invention.

Having described my invention, I claim:

1. In a pumping system, a centrifugal pump including an impeller having a shaft, an impeller housing, a shaft housing, and a packing gland between the shaft and its housing, a fluid-operated motor for rotating said shaft, a pumping system for supplying lubricating fluid at high pressure for operating said motor, a storage chamber communicating with said packing gland, a conduit for passing high pressure lubricating fluid from said pumping system to said storage chamber, a valve in said conduit, and a differential pressure regulator actuating said valve to maintain the fluid in said storage chamber at a slightly higher pressure than that existing in said impeller housing.

2. In a lubricating system, a shaft housing, a shaft to be lubricated extending through said housing, an impeller housing, an impeller driven by said shaft in said impeller housing, a system for pumping lubricating fluid in which the energy imparted to the fluid by the pump is converted into useful work, the pressure of said fluid being substantially higher than the pressure in said housing, and means for supplying lubricating fluid from said pumping system to said shaft housing at a pressure slightly higher than the impeller housing pressure adjacent the shaft comprising a storage chamber communicating with said shaft housing, a valve for controlling the flow of high pressure lubricating fluid from said lubricating fluid pumping system into said storage chamber, and a differential pressure regulator for said valve including means for comparing the storage chamber pressure with the sum of a fixed pressure and the impeller housing pressure adjacent the shaft to obtain a resultant differential pressure, and a valve operating member actuated by said differential pressure.

3. In a pumping system, a centrifugal pump including an impeller having a shaft, an impeller housing, a shaft housing, and a packing gland between the shaft and its housing, a fluid-operated motor for rotating said shaft, a pumping system for supplying lubricating fluid at high pressure for operating said motor, a vessel, a diaphragm dividing said vessel into two chambers, a conduit for passing high pressure lubricating fluid from said pumping system to one of said chambers, a valve in said conduit actuated by said diaphragm, a line connecting said one chamber to said packing gland, means for communicating the impeller housing pressure to the other of said chambers, and a spring biasing said diaphragm, said spring acting in opposition to the pressure in said one chamber.

OWEN L. GARRETSON.

REFERENCES CITED

The following references are of record in the file of this patent:

UNITED STATES PATENTS

| Number | Name | Date |
| --- | --- | --- |
| 1,841,863 | Van Rijswijk | Jan. 19, 1932 |
| 2,049,774 | Hoffman | Aug. 4, 1936 |
| 2,102,140 | Ungar | Dec. 14, 1937 |
| 2,107,260 | Ihara | Feb. 1, 1938 |
| 2,347,751 | Reeves et al. | May 2, 1944 |
| 2,425,885 | Jennings | Aug. 19, 1947 |
| 2,455,678 | Jennings | Dec. 7, 1948 |